United States Patent
Uehara et al.

[11] Patent Number: 5,547,722
[45] Date of Patent: Aug. 20, 1996

[54] ETHYLENE POLYMER AND FUEL TANK COMPRISING THE SAME

[75] Inventors: Yumito Uehara; Nobuo Enokido; Kiyotoshi Fujioka, all of Kanagawa; Nobuyuki Shimizu; Motonori Ueda, both of Okayama, all of Japan

[73] Assignee: Mitsubishi Kasei Corporation, Tokyo, Japan

[21] Appl. No.: 414,231

[22] Filed: Mar. 31, 1995

Related U.S. Application Data

[62] Division of Ser. No. 311,678, Sep. 23, 1994.

[30] Foreign Application Priority Data

Sep. 27, 1993 [JP] Japan .................... 5-239986
Sep. 29, 1993 [JP] Japan .................... 5-242926
Sep. 29, 1993 [JP] Japan .................... 5-242927

[51] Int. Cl.$^6$ ............. B65D 88/12; B32B 27/32; B32B 27/34
[52] U.S. Cl. .......... 428/35.7; 428/36.7; 428/476.1; 428/516; 428/520; 220/4.13; 220/4.14; 220/415
[58] Field of Search .............. 428/35.7, 36.7, 428/476.1, 516; 206/0.6; 220/4.13, 4.14

[56] References Cited

U.S. PATENT DOCUMENTS

| | | | |
|---|---|---|---|
| 5,073,420 | 12/1991 | Yano et al. ............... | 428/35.7 |
| 5,384,172 | 1/1995 | Takado et al. ............ | 428/516 |
| 5,441,781 | 8/1995 | Uchida et al. ........... | 428/476.1 |

*Primary Examiner*—Tae Yoon
*Attorney, Agent, or Firm*—Sughrue, Mion, Zinn, Macpeak & Seas

[57] ABSTRACT

An ethylene homopolymer or copolymer comprising ethylene and not more than 10% by weight of an α-olefin having from 3 to 20 carbon atoms and a fuel tank obtained therefrom are disclosed, said ethylene homopolymer or copolymer having (1) an intrinsic viscosity [η] of from 2 to 6 dl/g, (2) a density of from 0.945 to 0.970 g/cm$^3$, (3) an R value of from 2.5 to 4, said R value being defined as a $\sigma_2/\rho_1$ ratio, wherein $\sigma_1$ and $\sigma_2$ mean stress in elongation with a strain at 2 sec and 4 sec, respectively, under a flow at an elongational strain rate $\dot{\epsilon}$ of 0.5 sec$^{-1}$, and (4) a relationship between high-velocity impact strength (HRI-IZOD) measured at −30° C. and a melt index under a load of 21.6 kg (HLMI) satisfying formula:

$$HRI\text{-}IZOD \geq -\log HLMI + 1.15$$

The ethylene polymer exhibits high melt tension and excellent molding properties such as uniform stretchability in blow molding to provide molded articles, such as a fuel tank, having excellent mechanical characteristics, such as high stiffness and high impact resistance, and excellent fire resistance.

18 Claims, No Drawings

ETHYLENE POLYMER AND FUEL TANK COMPRISING THE SAME

This is a divisional of application Ser. No. 08/311,678 filed Sept. 23, 1994.

FIELD OF THE INVENTION

This invention relates to a novel ethylene polymer and a fuel tank using the same. More particularly, it relates to an ethylene polymer which exhibits high melt tension and excellent molding properties such as uniform stretchability in blow molding, especially for production of large-sized articles, to provide molded articles having excellent mechanical characteristics, such as high stiffness and high impact resistance, and excellent fire resistance. It also relates to a fuel tank having excellent impact resistance and fire resistance even with a smaller thickness than was used conventionally.

BACKGROUND OF THE INVENTION

In the automobile industry, replacement of metallic materials with plastics in various automobile parts has been promoted recently for the purpose of weight reduction and energy saving. Polyolefin resins are generally used for this purpose from the standpoint of cost and environmental conservation as well as product performance such as strength, weather resistance and chemical resistance.

Of the polyolefin resins, polyethylene is particularly suited to blow molding. Polyethylene having a relatively broad molecular weight distribution, high melt tension, and uniform stretchability is generally employed. In particular, large-sized blown polyethylene containers, such as fuel tanks or drums, have been attracting attention.

Fuel tanks made of high-molecular-weight and high-density polyethylene have large freedom of shape as compared with conventional steel-made fuel tanks and are mounted on such types of automobiles as 4 wheel drive cars or 4 wheel steering cars.

Ethylene polymers suitable for such use proposed to date include ethylene copolymers with excellent molding properties and environmental stress cracking resistance (hereinafter abbreviated as ESCR) as disclosed in Unexamined Published Japanese Patent Application No. 53811/90.

However, when high-density polyethylene is molded into fuel tanks of complicated shape, the wall of the resulting tank becomes thinner and weaker at bends so that the wall thickness of the whole tank must be increased, which leads to disadvantages for economy and weight reduction.

Where ethylene is copolymerized with an α-olefin aiming at improvements in mechanical properties, such as impact resistance and ESCR, the resulting copolymer, which generally has a relatively low density, has reduced stiffness. With the purpose of weight and thickness a reduction in mind, reduction in stiffness would cause deflection or deformation of fuel tanks on use or when piled up.

SUMMARY OF THE INVENTION

An object of the present invention is to provide an ethylene polymer which exhibits high melt tension and excellent molding properties such as uniform stretchability to provide molded articles having excellent mechanical characteristics, such as high stiffness and high impact resistance, and excellent fire resistance.

Another object of the present invention is to provide a thin, light and economical fuel tank with little thickness variation which has high stiffness and impact resistance as well as excellent fire resistance.

As a result of extensive investigations, the present inventors have found that an ethylene polymer, inclusive of an ethylene homopolymer and a copolymer of ethylene and other α-olefins, having a specific intrinsic viscosity, a specific R value (a parameter of molding properties), a specific relationship of high-velocity impact strength to melt index, a specific α-olefin content, and a specific density provides an ethylene polymer composition exhibiting excellent molding properties such as uniform stretchability in blow molding, especially in the production of large-sized articles, which enables one to provide molded articles having high stiffness and excellent impact resistance. They have also found that a fuel tank obtained from the above ethylene polymer composition has excellent impact resistance with a smaller wall thickness than in conventional ones.

The present invention relates to an ethylene homopolymer or an ethylene copolymer comprising ethylene and not more than 10% by weight of an α-olefin having from 3 to 20 carbon atoms, said ethylene homopolymer or copolymer having (1) an intrinsic viscosity [η] of from 2 to 6 dl/g, (2) a density of from 0.945 to 0.970 g/cm$^3$, (3) an R value of from 2.5 to 4, said R value being defined as a $\sigma_2/\sigma_1$ ratio, wherein $\sigma_1$ and $\sigma_2$ mean stress in elongation with a strain at 2 sec and 4 sec, respectively, under a flow at an elongational strain rate ε of 0.5 sec$^{-1}$, and (4) a relationship between high-velocity impact strength (hereinafter referred to as HRI-IZOD) measured at −30° C. and a melt index under a load of 21.6 kg (hereinafter referred to as HLMI) satisfying formula (1):

$$\text{HRI-IZOD} \geq -\log \text{HLMI} + 1.15 \qquad (1)$$

The present invention also relates to a fuel tank comprising the above-mentioned ethylene polymer.

DETAILED DESCRIPTION OF THE INVENTION

The ethylene polymer of the present invention is an ethylene homopolymer or a copolymer of ethylene and not more than 10% by weight, preferably not more than 5% by weight, of an α-olefin having from 3 to 20 carbon atoms, preferably from 4 to 10 carbon atoms. Examples of the α-olefins include propylene, butene-1, pentene-1, hexene-1, octene-1, decene-1, octadecene-1, 4-methylpentene-1, 3-methylbutene-1, 3-methyl-pentene-1, vinylcyclohexane, and styrene. If the α-olefin content in the ethylene copolymer exceeds 10% by weight, the copolymer has reduced stiffness.

It is essential for the ethylene polymer of the present invention to have an intrinsic viscosity [η] of from to 6 dl/g, preferably from 2.3 to 5.5 dl/g, and still more preferably from 3 to 5 dl/g. An ethylene polymer having an intrinsic viscosity of less than 2 dl/g has reduced mechanical strength and poor drawdown resistance. An ethylene polymer having in an intrinsic viscosity exceeding 6 dl/g has reduced moldability.

The ethylene polymer should have a density of from 0.945 to 0.970 g/cm$^3$, preferably from 0.955 to 0.970 g/cm$^3$, and still more preferably not less than 0.960 g/cm$^3$ and not more than 0.970 g/cm$^3$. An ethylene homopolymer is preferred over a copolymer. An ethylene polymer having a density of less than 0.945 g/cm³ has reduced stiffness.

It is required that the ethylene polymer should have an R value, expressed in terms of $\sigma_2/\sigma_1$, of from 2.5 to 4.0, preferably from 2.6 to 3.8, still more preferably from 2.7 to 3.5. The R value as used herein is a parameter indicative of an increase of stress in elongation with time under elongation flow, in which $\sigma_1$ and $\sigma_2$ mean stress in elongation with a strain at 2 sec and 4 sec, respectively, under a flow of an elongational strain rate $\epsilon$ of 0.5 sec$^{-1}$.

It is generally considered that resins having a high R value are apt to undergo hardening accompanying deformation (strain-hardening) at a part where a great strain is posed, such as corners of a mold, during blow molding and have satisfactory properties of controlling excessive elongation (uniform stretchability) at that part. A resin having an R value less than 2.5 has poor uniform stretchability and, when molded into a container having a complicated shape, has a thinner wall at a bend and has reduced strength at that part. Accordingly, in order to increase the wall thickness at the bend for assuring sufficient strength at that part, the wall thickness of the whole container must be so increased, which leads to disadvantages for economy and weight reduction. A resin having an R value exceeding 4 has deteriorated molding properties causing breakage on stretching, etc.

Further, the HRI-IZOD of the ethylene polymer of the present invention, measured at −30° C., should satisfy the following relationship:

$$\text{HRI-IZOD} \geq -\log \text{HLMI} + 1.15 \qquad (1)$$

If HRI-IZOD is lower than the above specified value, the resin has poor impact resistance. It is preferred that the HRI-IZOD satisfy the following relationship:

$$\text{HRI-IZOD} \geq -\log \text{HLMI} + 1.4 \qquad (1')$$

The above-mentioned R value and HRI-IZOD can be controlled by, for example, conducting polymerization under specific conditions in the presence of a specific catalyst or conducting multistage polymerization under specific conditions.

From the viewpoint of fire resistance, the ethylene polymer preferably has a melt tension (hereinafter referred to as MT) satisfying the following relationship with HLMI:

$$\text{MT} \geq -12.4 \log \text{HLMI} + 20.5 \qquad (2)$$

If MT is less than the above specified value, a fuel tank obtained with a reduced wall thickness tends to have reduced fire resistance. It is preferred that the MT satisfy the following relationship:

$$\text{MT} \geq -12.4 \text{HLMI} + 23.5 \qquad (2')$$

Further, the ethylene polymer preferably has a stiffness satisfying the following relationship with HRI-IZOD:

$$\text{Stiffness} \geq -5,000(\text{HRI-IZOD}) + 15,500 \qquad (3)$$

Furthermore, the ethylene polymer preferably has a melt rupture time (hereafter referred to as RT) of not shorter than 25 sec, more preferably 35 sec or longer. The term "melt rupture time" used herein means a time until the breakage of a test sample occurs when kept at 350° C. with a load of 50 g. If RT is less than the above specified value, a fuel tank made of the ethylene polymer has reduced fire resistance. In particular, when a fuel tank having a reduced wall thickness is caught in fire, the fuel leaks out in a short period of time.

The process for preparing the ethylene polymer according to the present invention is described below for illustrative purposes only but not for limitation.

The ethylene polymer of the present invention having the above-mentioned properties can be prepared by homopolymerizing ethylene or copolymerizing ethylene and an α-olefin containing 3 to 20 carbon atoms in the presence of a specific catalyst under specific conditions or conducting the polymerization in multiple stages under specific conditions.

The specific catalyst which can be used in the present invention includes a catalyst system mainly comprising (A) a solid catalyst component essentially containing a magnesium compound, a titanium compound, and a halogen and (B) an organoaluminum compound. More specifically, the catalyst system comprises (A) a hydrocarbon-insoluble solid catalyst component and (B) an organoaluminum compound, the solid catalyst component (A) being obtained by treating a uniform hydrocarbon solution containing (a) a magnesium compound represented by formula: $\text{Mg}(\text{OR}^1)_m X^1{}_{2-m}$ (wherein $R^1$ is an alkyl group, an aryl group or a cycloalkyl group; $X^1$ is a halogen atom; and m is 1 or 2), (b) a titanium compound represented by formula: $\text{Ti}(\text{OR}^2)_n X^2{}_{4-n}$ (wherein $R^2$ is an alkyl group, an aryl group or a cycloalkyl group; $X^2$ is a halogen atom; and n is an integer of 1 to 4, and (c) a polyalkyltitanate represented by formula (I):

wherein plural $R^3$'s, which may be the same or different, each represent an alkyl group, an aryl group or a cycloalkyl group; and p is an integer of 2 to 20, and, if desired, (d) an alcohol represented by formula: $R^4 \text{OH}$ (wherein $R^4$ represents an alkyl group, an aryl group or a cycloalkyl group), with a halogenating agent.

Magnesium compound (a) includes those represented by the above formula in which $R^1$ is an alkyl, aryl or cycloalkyl group having up to about 15 carbon atoms, e.g., a methyl, ethyl, propyl, butyl, pentyl, hexyl, octyl, tolyl, xylyl or cyclohexyl group, and $X^1$ is chlorine, bromine or iodine; such as dimethoxymagnesium, diethoxymagnesium, ethoxymagnesium chloride, and diphenoxymagnesium. Preferred of them are those in which m is 2.

Titanium compound (b) includes those represented by the above formula in which $R^2$ is an alkyl, aryl or cycloalkyl group having up to about 15 carbon atoms, e.g., a methyl, ethyl, propyl, butyl, pentyl, hexyl, octyl, tolyl, xylyl or cyclohexyl group, and $X^2$ is chlorine, bromine or iodine. Specific examples of such titanium compounds (b) include those in which n is 4, such as tetraethoxytitanium, tetrapropoxytitanium, and tetra-n-butoxytitanium; those in which n is 3, such as triethoxymonochlorotitanium, tripropoxymonochlorotitanium, and tri-n-butoxymonochlorotitanium; those in which n is 2, such as diethoxydichlorotitanium, dipropoxydichlorotitanium, and di-n-butoxydichlorotitanium; and those in which n is 1, such as ethoxytrichlorotitanium, propoxytrichlorotitanium, and n-butoxytrichlorotitanium. Preferred of them are those in which n is 4 or 3. Still preferred are tetra-n-butoxytitanium (n=4) and tri-n-butoxymonochlorotitanium (n=3).

Polyalkyltitanate (c) includes those represented by the above formula in which $R^3$ is an alkyl, aryl or cycloalkyl group having up to about 15 carbon atoms, e.g., a methyl, ethyl, propyl, butyl, pentyl, hexyl, octyl, tolyl, xylyl or cyclohexyl group. Specific examples of such polyalkyltitanates (c) include a di- to eicosamer of tetraethoxytitanium, a di- to eicosamer of tetrapropoxytitanium, a di- to eicosamer of tetrabutoxytitanium, a di- to eicosamer of tetrakis(2-ethylhexyloxy)titanium, and a di- to eicosamer of tetrastearyloxytitanium. Preferred of them are a di- to tetramer of tetrabutoxytitanium and a di- to decamer of tetrapropoxytitanium. In addition, a condensate of a tetraalkoxytitanium obtained by reacting a tetraalkoxytitanium with a small amount of water is also useful as component (c).

Alcohol (d), which may be used if desired, includes those represented by the above formula in which $R^4$ is an alkyl, aryl or cycloalkyl group having up to about 15 carbon atoms, e.g., a methyl, ethyl, propyl, butyl, pentyl, hexyl, octyl, tolyl, xylyl or cyclohexyl group. Examples of such alcohols (d) are ethyl alcohol, n-propyl alcohol, isopropyl alcohol, n-butyl alcohol, and n-octyl alcohol.

Preparation of solid catalyst component (A) starts with preparation of a uniform hydrocarbon solution containing magnesium compound (a), titanium compound (b), polyalkyltitanate (c) and, if desired, alcohol (d).

The hydrocarbon as a solvent includes aliphatic hydrocarbons, e.g., hexane and heptane; alicyclic hydrocarbons, e.g., cyclohexane; and aromatic hydrocarbons, e.g., benzene, toluene, and xylene. The hydrocarbon solution may be prepared either by previously mixing components (a), (b) and (c) while heating to prepare a uniform liquid mixture or by previously mixing components (a) and (b) while heating to prepare a uniform liquid mixture and then adding component (c) thereto, depending on the kinds of the components to be mixed. In case where the two or three components are hardly mixed into a uniform liquid mixture, alcohol (d) is preferably added. The order of addition of alcohol (d) is not particularly limited.

After mixing the components, the mixture is heated to 100° to 170° C. to obtain a uniform liquid mixture or a uniform alcoholic solution. A hydrocarbon solvent is then added thereto to obtain a hydrocarbon solution. Where alcohol (d) is used, the hydrocarbon solvent may be added after removal of the alcohol by distillation. Polyalkyltitanate (c) may be added after once preparing a uniform hydrocarbon solution containing components (a) and (b).

The thus prepared uniform hydrocarbon solution is then treated with a halogenating agent to obtain solid catalyst component (A). Any halogenating agent having a halogenation action may be used without restriction. Compounds having a halogen atom covalent bonded are generally used.

Suitable examples of the halogenating agent include chlorides, such as boron trichloride, titanium tetrachloride, silicon tetrachloride, tin tetrachloride, vanadium tetrachloride, and aluminum chloride; chlorine-containing compounds, such as hydrogen chloride, thionyl chloride, and chlorosulfonic acid; chlorine; bromine; and iodine, with titanium tetrachloride and silicon tetrachloride being preferred.

While not limiting, the halogenation treatment is usually carried out at a temperature of from room temperature up to 200° C. preferably up to 150° C., more preferably up to 120° C., either once or, if desired, repeatedly.

The halogenation treatment is preferably effected to such a degree of halogenation as-represented by formula (4), particularly formula (4'), shown below.

$$2 \leq \frac{X + X^1 + X^2}{R^1 + OR^2 + OR^3 + OR^4} \leq 20 \qquad (4)$$

$$5 \leq \frac{X + X^1 + X^2}{R^1 + OR^2 + OR^3 + OR^4} \leq 15 \qquad (4')$$

wherein X represents the mole number of the halogen atom in a halogenating agent; and $X^1$, $X^2$, $R^1$, $OR^2$, $OR^3$, and $OR^4$ represent the mole number of the respective group in components (a) to (d).

The thus formed hydrocarbon-insoluble solid is separated and washed with a hydrocarbon solvent to obtain solid catalyst component (A).

Components (a), (b), and (c) are preferably used at molar ratios of $0.1 \leq (b)/(a) \leq 5$ and $0.3 \leq (c)/(a) \leq 8$, still preferably $0.2 \leq (b)/(a) \leq 2$ and $0.5 \leq (c)/(a) \leq 4$.

Out of the above-specified molar ratios, the resulting ethylene polymer tends to be inferior in molding properties, such as uniform stretchability, and impact resistance. Alcohol (d) is used in an amount enough to obtain a uniform liquid mixture as stated above.

Organoaluminum compound (B), which serves as a co-catalyst, includes those represented by formula: $AlR^5_q(OR^6)_r X^5_{3-(q+r)}$, wherein $R^5$ and $R^6$ each represent an alkyl group, an aryl group or a cycloalkyl group, preferably having up to 8 carbon atoms, more preferably up to 4 carbon atoms, but not less than 2 carbon atoms; $X^5$ represents a halogen atom; q represents 2 to 3; and r represents 0 to 1, provided that q+r is not more than 3. Specific examples of such organoaluminum compounds (B) are triethylaluminum, triisobutylaluminum, diethylaluminum monochloride, diisobutylaluminum monochloride, and diethylaluminum monoethoxide. A reaction product between a trialkylaluminum and water may also be used as component (B). These organo-aluminum compounds may be used either individually or in combination of two or more thereof.

The amount of organoaluminum compound (B) to be used, when expressed in terms of the product of the concentration of Al of organoaluminum compound (B) in an inert solvent used for polymerization of ethylene (and α-olefin) (Al; mmol/l) and an atomic ratio of Al in organoaluminum compound (B) to mi in solid catalyst component (A) (Al/Ti), i.e., [Al] (mmol/l)×(Al/Ti), ranges from 1.2 to 0.02, preferably from 1.0 to 0.03, still preferably from 0.5 to 0.05.

If the amount of organoaluminum compound (B) is below the above specified range, the catalyst system tends to have reduced polymerization activity. Above the specified range, the resulting ethylene polymer tends to be inferior in molding properties, such as uniform stretchability, and impact resistance.

Homopolymerization of ethylene or copolymerization of ethylene and an α-olefin is carried out in the presence of the above-mentioned catalyst system by slurry polymerization or solution polymerization in an inert solvent or gaseous phase polymerization. The inert solvent to be used includes aliphatic hydrocarbons, e.g., butane, hexane and heptane; alicyclic hydrocarbons, e.g., cyclohexane; and aromatic hydrocarbons, e.g., benzene and toluene. The reaction is usually conducted at a temperature of from room temperature to 200° C. under a pressure of from atmospheric pressure to 100 atm. Hydrogen may be introduced into the reaction system to control the molecular weight.

Polymerization may be performed either by one-stage polymerization or multi-stage polymerization. Multi-stage polymerization can be carried out by, for example, a two-stage polymerization method in which polymerization in a second reaction zone is conducted in the presence of a polymerization reaction product obtained in a first reaction zone. More specifically, ethylene is homopolymerized in either one of the reaction zones to produce polymer A having a viscosity-average molecular weight ($M_A$) of from 60,000 to 150,000 to a proportion of from 60 to 90% by weight based on the total polymer produced, and ethylene is homopolymerized or copolymerized with an α-olefin in the other reaction zone to produce polymer B having an α-olefin content of from 0 to 10% by weight and a viscosity-average molecular weight ($M_B$) of from 500,000 to 4,000,000 to a proportion of from 10 to 40% by weight, with the molecular weight ratio ($M_B/M_A$) of polymer B to polymer A falling within a range of from 3/1 to 50/1.

Another examples of the specific catalyst for preparing the ethylene polymer of the present invention is a catalyst system comprising (A) a hydrocarbon-insoluble solid catalyst component and (B) an organoaluminum compound, the solid catalyst component (A) being obtained by treating a uniform hydrocarbon solution containing (a) a magnesium compound represented by formula: $Mg(OR^1)_m X^1_{2-m}$ (wherein $R^1$ is an alkyl group, an aryl group or a cycloalkyl group; $X^1$ is a halogen atom; and m is 1 or 2), (b) a titanium compound represented by formula: $Ti(OR^2)_n X^2_{4-n}$ (wherein $R^2$ is an alkyl group, an aryl group or a cycloalkyl group; $X^2$ is a halogen atom; and n is an integer of 1 to 4, and, if desired, (c) an alcohol represented by formula: $R^4OH$ (wherein $R^4$ represents an alkyl group, an aryl group or a cycloalkyl group), with a solution comprising (d) titanyl chloride ($TiOCl_2$) and (e) a halogen-containing compound having no reducing ability (hereinafter referred to as non-reducing halogen compound). Magnesium compound (a), titanium compound (b), alcohol (c), and a hydrocarbon solvent to be used here are the same as those hereinbefore enumerated. The hydrocarbon solution is prepared by previously bringing magnesium compound (a) and titanium compound (b) into contact to prepare a uniform liquid mixture. Where components (a) and (b) are hardly mixed into a uniform liquid, it is recommended to use alcohol (c). The order of addition of alcohol (c) is not particularly limited.

After mixing the components, the mixture is heated to 100° to 170° C. to obtain a uniform liquid mixture or a uniform alcoholic solution. A hydrocarbon solvent is then added thereto to obtain a hydrocarbon solution. Where alcohol (c) is used, the hydrocarbon solvent may be added after removal of the alcohol by distillation.

The resulting uniform hydrocarbon solution is then treated with a solution containing titanyl chloride (d) and non-reducing halogen compound (e) to obtain solid catalyst component (A).

The solution containing titanyl chloride (d) and non-reducing halogen compound (e) is prepared by mixing these components while heating.

While non-reducing halogen compound (e) is not particularly limited, compounds having high dissolving power for titanyl chloride are preferred. Particularly preferred are titanium tetrachloride and silicon tetrachloride, with titanium tetrachloride being still preferred.

The manner of treating the uniform hydrocarbon solution with the solution of components (d) and (e) is not particularly restricted, but the treating solution of component (d) and (e) is preferably uniform. The treatment is preferably carried out at a temperature of from room temperature to 200° C. The thus formed hydrocarbon-insoluble solid is collected and washed with a hydrocarbon solvent to obtain solid catalyst component (A).

Components (a), (b), and (d) are preferably used at molar ratios of $0.01 \leq (b)/(a) \geq 10$ and $0.1 \leq (d)/(a) \leq 50$. Non-reducing halogen compound (e) is preferably used in an amount satisfying formula (5):

$$1 \leq \frac{X + X^1 + X^2}{OR^1 + OR^2 + OR^4} \leq 30 \tag{5}$$

wherein X represents the mole number of the halogen atom in non-reducing halogen compound (e); and $X^1$, $X^2$, $OR^1$, $OR^2$, and $OR^4$ represent the mole number of the respective group in components (a) to (c).

Out of the above specified molar ratios, the resulting ethylene polymer tends to have poor molding properties, such as uniform stretchability, and poor impact resistance.

Alcohol (c) is used in an amount enough to prepare a uniform liquid mixture.

Organoaluminum compound (B), which serves as a co-catalyst, is the same as that described above.

The amount of organoaluminum compound (B) to be used, when expressed in the same manner as described above, i.e., [Al](mmol/l)×(Al/Ti), ranges from 2.0 to 0.01, preferably from 1.0 to 0.02.

Below the above specified range, the catalyst system tends to have reduced polymerization activity. Above the above specified range, the resulting ethylene polymer tends to be inferior in molding properties, such as uniform stretchability, and impact resistance.

Homopolymerization of ethylene or copolymerization of ethylene and an α-olefin is carried out in the presence of the above-mentioned catalyst system in the same manner as described above.

Polymerization may be performed either by one-stage polymerization or multi-stage polymerization as described above.

The ethylene polymer according to the present invention is characterized by excellent molding properties, such as uniform stretchability, high stiffness, and excellent impact resistance.

The ethylene polymer to be molded may contain known additives, such as fillers, pigments, photo-stabilizers, heat stabilizers, flame retardants, plasticizers, antistatics, parting agents, blowing agents, and nucleating agents.

The fuel tank according to the present invention can be produced by known molding methods, typically blow molding. For example, the ethylene polymer is extruded from an extruder through a die to form a parison, and the parison is inflated with air from the inside and brought into intimate contact with a mold and cooled simultaneously.

The ethylene polymer of the present invention is liable to undergo strain-hardening to exhibit a property of controlling excessive elongation at a strain-imposed part. Therefore, the parison can be blown up while leveling deformation of the parison at bends of a mold to provide a hollow article with its wall at the bends thickened as compared with articles obtained from conventional ethylene polymers.

A fuel tank having a multi-layer structure can be produced by, for example, as follows. Resins for each layer are separately plasticized in a plurality of extruders, introduced into the same die having concentric ring flow paths, laminated in the die while levelling the thickness of each layer to prepare an apparently one-layered parison. The parison is inflated and cooled in the same manner as described above to produce a multi-layer fuel tank.

A multi-layer fuel tank preferably has a 5-layered structure composed of 3 kinds of layers, in which a high-density polyethylene layer comprising the ethylene polymer of the present invention is laminated on both sides of a gas barrier layer via an adhesive layer. The gas barrier layer has a thickness of from 0.01 to 0.5 mm, preferably from 0.1 to 0.3 mm; the adhesive layer from 0.01 to 0.5 mm, preferably from 0.1 to 0.3 mm; and the high-density polyethylene layer from 1 to 10 mm, preferably from 1.5 to 5 mm.

The laminate type multi-layer container comprising a gas barrier layer having on at least one side thereof a polyethylene layer comprising the ethylene polymer of the present invention is suitable as a fuel tank.

The gas barrier layer is prepared from a polyamide resin, a thermoplastic polyester resin, such as polyethylene terephthalate or polybutylene terephthalate, or an ethylene-vinyl acetate copolymer saponification product, such as an ethylene-vinyl acetate copolymer having a degree of saponification of not less than 93%, preferably not less than 96%, and an ethylene content of from 25 to 50 mol %.

Polyamide resins are particularly preferred as a gas barrier layer for their molding stability and gas barrier performance. Polyamide resins having a relative viscosity of from about 1 to 6 and a melting point of from 170° to 280° C., preferably from 200° to 240° C., are generally used. Suitable polyamide resins include those obtained by polycondensation of a diamine compound and a dicarboxylic acid, those obtained by condensation of an aminocarboxylic acid; those obtained from a lactam; and their copolyamide resins. Specific examples of these polyamide resins are nylon 6, nylon 66, nylon 610, nylon 9, nylon 11, nylon 12, nylon 6/66, nylon 66/610, and nylon 6/11, with nylon 6 being particularly suitable.

In the multi-layer fuel tank, the gas barrier layer preferably comprises a modified polyamide resin composition comprising the above-mentioned polyamide resin and a maleic anhydride-modified ethylene/α-olefin copolymer. The maleic anhydride-modified ethylene/α-olefin copolymer to be used is prepared by grafting maleic anhydride to an ethylene/α-olefin copolymer having a degree of crystallization of from 1 to 35%, preferably from 1 to 30%, and a melt index of from 0.01 to 50 g/10 min, preferably from 0.1 to 20 g/10 min, at a grafting ratio of from 0.05 to 1% by weight, preferably from 0.2 to 0.6% by weight. The α-olefin in the ethylene/α-olefin copolymer includes propylene, butene-1, and hexene-1. The α-olefin content in the copolymer is not more than 30% by weight, preferably from 5 to 20% by weight.

The maleic anhydride-modified ethylene/α-olefin copolymer is used in an amount of from 10 to 50 parts by weight, preferably from 10 to 30 parts by weight, per 100 parts by weight of the polyamide resin. The polyamide resin and the maleic anhydride-modified ethylene/α-olefin copolymer are kneaded in an extruder, etc. at 200° to 280° C.

The resin constituting the adhesive layer includes a modified polyolefin obtained by grafting an unsaturated carboxylic acid or a derivative, thereof to a homo- or copolymer of an α-olefin, such as ethylene or propylene, at a grafting ratio of from 0.01 to 1% by weight, preferably from 0.02 to 0.6% by weight. In particular, a modified high-density ethylene homo- or copolymer containing not more than 3% by weight, preferably 0.05 to 0.5% by weight, of another α-olefin, such as propylene, butane-1 or hexene-1, and having a density of from 0.940 to 0.970 g/cm³ is preferred.

The unsaturated carboxylic acid or a derivative thereof as a grafting monomer includes acrylic acid, mathacrylic acid, maleic acid, fumaric acid, itaconic acid, citraconic acid, and an anhydride of these acids, with maleic anhydride being preferred.

The present invention will now be illustrated in greater detail with reference to Examples, but it should be understood that the present invention is not construed as being limited thereto. All the percents and parts are by weight unless otherwise indicated.

Various physical properties of resins were measured according to the following methods.

1) Intrinsic Viscosity [η];
   Measured in tetralin at 130° C.
2) Density:
   Measured in accordance with JIS K6760.
3) R Value (indication of uniform stretchability):
   R value, defined as $\sigma_2/\sigma_1$, is indicative of a rate of increase in stress in elongation with time under elongation flow, wherein $\sigma_1$ and $\sigma_2$ mean a stress in elongation at an elongation strain $\epsilon=1$ and 2, respectively, under flow having an elongation strain rate $\dot\epsilon=0.5$ sec$^{-1}$, $\sigma=\eta_E\times\dot\epsilon$ ($\eta_E$: elongation viscosity; $\dot\epsilon$: elongation strain rate). Accordingly, $$\sigma_1 = \eta_E(t=2.0;\ \dot\epsilon=0.5)\times 0.5$$

$$\sigma_2 = \eta_E(t=4.0;\ \dot\epsilon=0.5)\times 0.5$$

(t: time (sec))

The elongation flow characteristics can be estimated as follows.

The Giesekus constitutive equation (6) is solved analytically for a uniaxial elongation stress under the condition of constant strain rate, to give elongation viscosity (6):

$$\underline{\sigma}_i + \tau_i \underline{\overset{\nabla}{\sigma}}_i + \frac{\alpha}{H_i}\underline{\sigma}_i^2 = 2\tau_i H_i \underline{D} \qquad (6)$$

wherein $\underline{\sigma}_i$: Finger tensor; $\tau_i$: relaxation time; $H_i$: relaxation spectrum intensity; $D$: deformation rate tensor; $\alpha$: nonlinear parameter; subscript i represents assignment to the ith Maxwell element in multi-mode analysis; and $\nabla$ represents an upper-convected time differential.

$$\eta_E = \sum_{i=1}^{n} \tau_i H_i T_i \qquad (7)$$

wherein $$T_i(t) = \frac{4\{1-\exp(-R_{1i}t/\tau_i)\}}{1-2\zeta_i + R_{1i} - (1-2\zeta_i - R_{1i})\exp(-R_{1i}t/\tau_i)} + $$

$$\frac{4\{1-\exp(-R_{2i}t/\tau_i)\}}{1+\zeta_i + R_{2i} - (1+\zeta_i - R_{2i})\exp(-R_{2i}t/\tau_i)}$$

$$R_{1i} = \sqrt{1+4(2\alpha-1)\zeta_i + 4\zeta_i^2}\ ,$$

$$R_{2i} = \sqrt{1-2(2\alpha-1)\zeta_i + \zeta_i^2}\ ,$$

$$\zeta_i = \tau_i \dot\epsilon$$

Relaxation spectrum $H_i$ ($\tau_i$) and nonlinear parameter $\alpha$ were obtained as follows.
1) Measurement:
   Measurements of dynamic viscoelasticity necessary for obtaining a relaxation spectrum were made with Mechanical Spectrometer RMS-800, manufactured by Rheometrics Co., using a cone-and-plate viscometer having a diameter of 25 mm, the angle between the cone and the plate being 0.1 rad (hereinafter referred to as a conical angle). The measuring frequency ranged from 0.01 to 100 rad/sec.

Measurements of stationary shear viscosity over a broad range were made with RSR-M (manufactured by Rheometrics Co.), RMS-800, and a capillary viscometer INTESCO 2020 (manufactured by Intesco Co.) using a rotor having a diameter of 25 mm and a conical angle of 0.1 rad in RSR-M, a rotor having a diameter of 7.9 mm and a conical angle of 0.1 rad in RMS-800, and a capillary having a diameter of 1.0 mm and a length of 50 0 mm, set at an entrance angle of 90°, in INTESCO 2020. The shear rate was corrected by Rabinowitch correction.

RSR-M was used mainly for measurements at a shear rate $\gamma$ between $10^{-5}$ and $10^{-3}$ sec$^{-1}$, RMS-800 at $\gamma=10^{-3}$ to $10^0$ sec$^{-1}$, and INTESCO 2020 at $\gamma=10^0$ to $10^3$ sec$^{-1}$, respectively.

All the measurements were conducted at 190° C. A press molded specimen having a thickness of 1.0 mm was used for measurements with RSR-M and RMS-800, and a pellet specimen was used for INTESCO 2020.

2) Calculation of Relaxation Spectrum H ($\tau$):

Of the dynamic viscoelasticity data, storage elastic modulus G' ($\omega$) was approximated by a regression curve of arbitrary order (usually of second order) using a least-squares method, and the relaxation spectrum was calculated according to equation (8) (Tschoegl's second approximation):

$$H(\tau) = \frac{dG'}{d\ln\omega} - \frac{1}{2}\frac{d^2 G'}{d(\ln\omega)^2}, \quad \frac{1}{\omega} = \frac{\tau}{\sqrt{2}} \tag{8}$$

wherein $\omega$ is a circular frequency; and $\tau$ is a relaxation time.

While the relaxation spectrum obtained from equation (8) is given as a continuous function, the spectrum should be converted to a discontinuous line spectrum in actually performing various calculations according to multi-mode constitutive equations. So, the relaxation spectrum curve was converted into a histogram whose time intervals are spaced equally on a natural logarithmic axis from $10^{-3}$ sec as the shortest time up to $10^3$ to $10^5$ sec as the longest time.

Adequacy of the range of relaxation time $\tau$ selected in preparing a linear spectrum was judged by confirming that the resulting linear spectrum reproduced the measured value G' ($\omega$) according to equation:

$$G'(\omega) = \sum_{i=1}^{n} H_i \frac{\omega^2 \tau_i^2}{1 + \omega^2 \tau_i^2}$$

The boundary value in the long time range was decided depending on whether zero shear viscosity [$\eta_0$] is reproduced by combination of the resulting linear spectra according to equation:

$$\eta_0 = \sum_{i=1}^{n} \tau_i H_i$$

The relaxation spectrum ($\tau$) obtained directly from actual measurements of dynamic viscoelasticity ranged from $\sqrt{2}\times10^{-2}$ to $\sqrt{2}\times10^2$ sec. Values out of this range were obtained by extrapolation of the regression curve of the relaxation spectrum within the measured range. The order of the regression curve used here was the same as selected in obtaining a relaxation spectrum from a storage elastic modulus.

3) Decision of Nonlinear Parameter $\alpha$:

Analytical solution of equation (6) for stationary shear flow leads to stationary shear viscosity [$\eta$] represented by equation (9):

$$\eta = \sum_{i=1}^{n} \frac{2(1-\alpha)f_i^2}{1+(1-\alpha)f_i} \tau_i H_i, \tag{9}$$

$$f_i^2 = \frac{-1 + \sqrt{1+16\alpha(1-\alpha)\tau_i^2\dot\gamma^2}}{8\alpha(1-\alpha)\tau_i^2\dot\gamma^2}$$

The relaxation spectrum $H_i$ decided by (7) above was substituted in equation (9), and the value $\alpha$ was decided so as to reproduce the stationary shear viscosity curve as actually obtained.

4) Stiffness:

Measured in accordance with ASTM D747.

5) HRI-IZOD:

Preparation of Specimen:

A 6.0 mm wide and 9.55 mm thick pressed piece was cut to a length of 63.5 mm and notched according to JIS K7110.

Measurement:

Izod impact strength was measured with an impact tester Model GRC 8250 manufactured by Dynatap Co. under conditions of −30° C. and 7.7 m/sec.

6) Melt Index (HLMI):

Measured at 190° C. under a load of 21.6 kg according to ASTM D1238-57T.

7) Melt Tension (MT):

Melt Tension Tester manufactured by Toyo Seiki Co., Ltd. was used. A sample melted at 190° C. was extruded through an orifice of 1 mm in diameter, 5 mm in length and 60° in entrance angle at a fixed output rate of 0.44 g/min and taken off at a speed of 0.94 m/min, and the tension was obtained. The draft ratio (take-off speed/nozzle linear velocity) was 1.25.

8) Melt Rupture Time (RT)

A press-molded plate (7×4.9×70 mm) of a sample was fixed at one end of the plate, and a load of 50 g was imposed in the longitudinal direction (70 mm) at 310° C. The time at break of the plate under the condition was measured.

9) Environmental Stress Cracking Resistance (ESCR)

Measured according to JIS K6760 using a 10% lyponex aqueous solution.

EXAMPLE 1

1) Preparation of Solid Catalyst Component

A 3 l flask equipped with a condenser was thoroughly dried and purged with nitrogen, and 66.5 g (0.58 mol) of diethoxymagnesium [Mg(OEt)$_2$] and 98.7 g (0.29 mol) of tetrabutoxytitanium [Ti(OBu)$_4$] were charged therein. The mixture was heated at 130° C. for 4 hours with stirring to obtain a uniform viscous liquid. After cooling to about 80° C., 1.0 l of toluene was added thereto to obtain a uniform toluene solution.

The whole amount of the toluene solution was transferred to a 24 l autoclave having been thoroughly dried and purged with nitrogen. To the toluene solution was added 1272 g (1.31 mol) of a tetrabutoxytitanium tetramer, and 4.5 l of toluene was further added thereto.

Separately, 4.24 l (38.6 mol) of titanium tetrachloride [TiCl$_4$] was diluted with toluene at 40° C. with stirring to a concentration of 4.55 mol/l and added to the above mixture over a period of 3 hours. Subsequently, the mixture was heated up to 105° C. over a period of 30 minutes, at which the mixture was maintained for 1 hour.

After cooling, the mixture was washed with n-hexane to obtain a solid catalyst component. The Ti content in the resulting solid catalyst component was 34.9%.

2) Preliminary Polymerization of Ethylene

In a 300 l reaction vessel for preliminary polymerization was charged 220 l of n-hexane, and 360 g of the solid catalyst component prepared in (1) above was added thereto. To the reaction vessel was introduced 2 kg/cm$^2$ of hydrogen, and the temperature was elevated to 80° C., at which ethylene was continuously fed to the reaction vessel together with 0.36 mol of triethylaluminum to start preliminary polymerization. Preliminary polymerization was continued for 0.5 hour to obtain polyethylene in an amount of 10 g per gram of the solid catalyst component. After completion of the preliminary polymerization, the reaction product was cooled and washed with n-hexane.

3) Polymerization of Ethylene

To a continuous polymerization apparatus having a 500 l reactor were continuously fed 27 kg/hr of ethylene, 63 kg/hr of n-hexane, and hydrogen in such an amount that the resulting polyethylene might have the intrinsic viscosity shown in Table 1 below. Simultaneously, the preliminarily polymerized catalyst component prepared in (2) above and triethylaluminum were introduced at a rate of 2.5 g/hr and 1.5 g/hr, respectively. Homopolymerization of ethylene was carried on at 80° C. under a total pressure of 25 kg/cm$^2$ for an average retention time of 3 hours. The polyethylene in the reactor was introduced to a degassing tank at a rate of 25 kg/hr, roughly separated, and dried to obtain a powdered polymer.

EXAMPLE 2

1) Preparation of Solid Catalyst Component

A 3 l flask equipped with a condenser was thoroughly dried and purged with nitrogen, and 133 g (1.16 mol) of Mg(OEt)$_2$ and 197 g (0.58 mol) of Ti(OBu)$_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen. To the toluene solution was added 957 g (0.986 mol) of a tetrabutoxytitanium tetramet, and 5.8 l of toluene was further added thereto.

Separately, 1.99 l (18.13 mol) of TiCl$_4$ was diluted with toluene at 40° C. with stirring to a concentration of 4.55 mol/l and added to the above mixture over a period of 3 hours. Subsequently, the mixture was heated up to 105° C. over a period of 30 minutes, at which the mixture was maintained for 1 hour.

After cooling, the supernatant liquor was withdrawn by decantation and washed with 10 l of toluene. To the solution was added 4.0 l of toluene, and the 4.55 mol/l toluene solution of TiCl$_4$ was again added thereto to a total amount of TiCl$_4$ of 18.13 mol. Subsequently, the mixture was heat treated at 105° C. for 1 hour, cooled, and washed with n-hexane to recover a solid catalyst component. The Ti content in the resulting solid catalyst component was 33.8%.

2) Preliminary Polymerization of Ethylene

Ethylene was preliminarily polymerized under the same conditions as in Example 1, except for using 730 g of the above-prepared solid catalyst component and 0.52 mol of triethylaluminum.

3) Polymerization of Ethylene

Ethylene was polymerized in the same manner as in Example 1, except for feeding 2.5 g/hr of the above preliminarily polymerized catalyst and 1.5 g/hr of triethylaluminum.

EXAMPLE 3

1) Preparation of Solid Catalyst Component

A 3 l flask equipped with a condenser was thoroughly dried and purged with nitrogen, and 133 g (1.16 mol) of Mg(OEt)$_2$ and 197 g (0.58 mol) of Ti(OBu)$_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen. To the toluene solution was further added 5.89 l of toluene.

A previously prepared heated solution containing 0.99 mol of TiOCl$_2$ and 11.6 mol of TiCl$_4$ was added to the above mixture over a period of 3 hours. Subsequently, the mixture was heated up to 105° C. over a period of 30 minutes, at which the mixture was maintained for 1 hour. After cooling, the reaction product was washed with n-hexane to obtain a solid catalyst component. The Ti content in the resulting solid catalyst component was 33.5%.

2) Preliminary Polymerization of Ethylene

Ethylene was preliminarily polymerized under the same conditions as in Example 1, except for using 730 g of the above-prepared solid catalyst component and 0.52 mol of triethylaluminum.

3) Polymerization of Ethylene

Ethylene was polymerized in the same manner as in Example 1, except for feeding 2.5 g/hr of the above preliminarily polymerized catalyst and 1.75 g/hr of triethylaluminum and continuously feeding hydrogen and butene-1 at such a rate that the resulting ethylene polymer might have the intrinsic viscosity and density shown in Table 1.

EXAMPLE 4

1) Preparation of Solid Catalyst Component

A solid catalyst component was prepared in the same manner as in Example 1, except for changing the amount of the tetrabutoxytitanium tetramet to 844 g (0.87 mol). The Ti content in the resulting solid catalyst component was 31.2%.

2) Preliminary Polymerization of Ethylene

Ethylene was preliminarily polymerized under the same conditions as in Example 1.

3) Polymerization of Ethylene

To the same continuous polymerization apparatus as used in Example 1 were fed continuously 27 kg/hr of ethylene, 63 kg/hr of n-hexane, and hydrogen at such a rate that the resulting polyethylene might have the intrinsic Viscosity shown in Table 1. Simultaneously, 1.7 g/hr of the above prepared preliminarily polymerized catalyst component and 1.75 g/hr of triethylaluminum were fed thereto to conduct polymerization at 90° C. under a total pressure of 25 kg/cm$^2$ to obtain polyethylene having a viscosity-average molecular weight of 120,000 in a proportion of 75% based on the total polymer produced. The polyethylene in the reactor was introduced to a degassing tank at a prescribed speed, where hydrogen was separated, and then to a 500 l reactor for second stage reaction. To the second stage reactor were continuously fed 9 kg/hr of ethylene and 21 kg/hr of n-hexane to conduct polymerization at 50° C. for an average retention time of 1.5 hours to produce a second-stage polyethylene having a viscosity-average molecular weight of 1,300,000 in a proportion of 25% based on the total polymer produced. After completion of the reaction, the whole polymer had a viscosity-average molecular weight of 340,000.

EXAMPLE 5

1) Preparation of Solid Catalyst Component

A 3 l flask equipped with a condenser was thoroughly dried and purged with nitrogen, and 66.5 g (0.58 mol) of $Mg(OEt)_2$ and 98.7 g (0.29 mol) of $Ti(OBu)_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen. To the toluene solution was added 1272 g (1.31 mol) of a tetrabutoxytitanium tetramet, and 4.5 l of toluene was further added thereto.

Separately, 4.24 l (38.6 mol) of $TiCl_4$ was diluted with toluene at 40° C. with stirring to a concentration of 4.55 mol/l and added to the above mixture over a period of 3 hours. Subsequently, the mixture was heated up to 105° C. over a period of 30 minutes, at which the mixture was maintained for 1 hour. After cooling, the reaction product was washed with n-hexane to obtain a solid-catalyst component. The Ti content in the resulting solid catalyst component was 34.9%.

2) Preliminary Polymerization of Ethylene

In a 300 l reaction vessel for preliminary polymerization was charged 220 l of n-hexane, and 360 g of the solid catalyst component prepared in (1) above was added thereto. To the mixture was introduced 2 kg/cm² of hydrogen, and the temperature was elevated to 80° C., at which ethylene was continuously fed to the reaction vessel together with 0.36 mol of triethylaluminum to start preliminary polymerization. Preliminary polymerization was continued for 0.5 hour to obtain polyethylene in a yield of 10 g per gram of the solid catalyst component. After completion of the preliminary polymerization, the reaction product was cooled and washed with n-hexane.

3) Polymerization of Ethylene

To a continuous polymerization apparatus having a 500 l reactor were continuously fed 27 kg/hr of ethylene, 63 kg/hr of n-hexane, and hydrogen in such an amount that the resulting polyethylene might have the intrinsic viscosity shown in Table 1. Simultaneously, the preliminarily polymerized catalyst prepared in (2) above and triethylaluminum were introduced at a rate of 2.5 g/hr and 1.5 g/hr, respectively. Homopolymerization of ethylene was carried on at 80° C. under a total pressure of 25 kg/cm² for an average retention time of 3 hours. The polyethylene in the reactor was introduced to a degassing tank at a rate of 25 kg/hr, roughly separated, and dried to obtain a powdered polymer.

EXAMPLE 6

1) Preparation of Solid Catalyst Component

A 3 l flask equipped with a condenser was thoroughly dried and purged with nitrogen, and 133 g (1.16 mol) of $Mg(OEt)_2$ and 197 g (0.58 mol) of $Ti(OBu)_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen. To the toluene solution was further 5.89 l of toluene.

A previously prepared heated solution containing 0.99 mol of $TiOCl_2$ and 11.6 mol of $TiCl_4$ was added to the above toluene solution over a period of 3 hours. Subsequently, the mixture was heated up to 105° C. over a period of 30 minutes, at which the mixture was maintained for hour. After cooling, the reaction product was washed with n-hexane to obtain a solid catalyst component. The Ti content in the resulting solid catalyst component was 33.5%.

2) Preliminary Polymerization of Ethylene

Ethylene was preliminarily polymerized under the same conditions as in Example 5, except for using 730 g of the above-prepared solid catalyst component and 0.52 mol of triethylaluminum.

3) Polymerization of Ethylene

Ethylene was polymerized in the same manner as in Example 5, except for feeding 2.5 g/hr of the above preliminarily polymerized catalyst and 1.75 g/hr of triethylaluminum and continuously feeding hydrogen and butene-1 at such a rate that the resulting ethylene polymer might have the intrinsic viscosity and density shown in Table 1.

EXAMPLE 7

1) Preparation of Solid Catalyst Component

A solid catalyst component was prepared in the same manner as in Example 5, except for changing the amount of the tetrabutoxytitanium tetramet to 844 g (0.87 mol). The Ti content in the resulting solid catalyst component was 31.2%.

2) Preliminary Polymerization of Ethylene

Ethylene was preliminarily polymerized under the same conditions as in Example 5.

3) Polymerization of Ethylene

To the same continuous polymerization apparatus as used in Example 5 were fed continuously 27 kg/hr of ethylene, 63 kg/hr of n-hexane, and hydrogen at such a rate that the resulting polyethylene might have the intrinsic viscosity shown in Table 1. Simultaneously, 1.7 g/hr of the above prepared preliminarily polymerized catalyst component and 1.75 g/hr of triethylaluminum were fed thereto to conduct polymerization at 90° C. under a total pressure of 25 kg/cm² to obtain polyethylene having a viscosity-average molecular weight of 120,000 in a proportion of 75% based on the total polymer produced. The polyethylene in the reactor was forwarded to a degassing tank at a prescribed speed, where hydrogen was separated, and then to a 500 l reactor for second stage reaction. To the second stage reactor were continuously fed 9 kg/hr of ethylene and 21 kg/hr of n-hexane to conduct polymerization at 50° C. for an average retention time of 1.5 hours to produce second-stage polyethylene having a viscosity-average molecular weight of 1,300,000 in a proportion of 25% based on the total polymer produced. After completion of the reaction, the whole polymer had a viscosity-average molecular weight of 340,000.

EXAMPLE 8

1) Preparation of Solid Catalyst Component

A 3 l flask equipped with a condenser was thoroughly dried and purged with nitrogen, and 133 g (1.16 mol) of Mg(OEt)$_2$ and 197 g (0.58 mol) of Ti(OBu)$_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen. To the toluene solution was added 1013 g (1.044 mol) of a tetrabutoxytitanium tetramer, and 5.96 l of toluene was further added thereto.

Separately, 2.07 l (18.9mol) of TiCl$_4$ was diluted with toluene at 40° C. with stirring to a concentration of 4.55 mol/l and added to the above mixture over a period of 3 hours. Subsequently, the mixture was heated up to 105° C. over a period of 30 minutes, at which the mixture was maintained for 1 hour. After cooling, 12.5 l of the supernatant liquor was withdrawn by decantation and washed with 10 l of toluene. To the solution was added 4.0 l of toluene, and the 4.55 mol/l toluene solution of TiCl$_4$ was again added thereto to a total TiCl$_4$ amount of 18.9 mol. Subsequently, the mixture was heat treated at 105° C. for 1 hour. After cooling, the reaction product was washed with n-hexane to obtain a solid catalyst component. The Ti content in the resulting solid catalyst component was 34.6%.

2) Preliminary Polymerization of Ethylene

In a 300 l reaction vessel for preliminary polymerization was charged 220 l of n-hexane, and 730 g of the solid catalyst component prepared in (1) above was added thereto. Into the mixture was introduced 2 kg/cm$^2$ of hydrogen, and the temperature was elevated to 80° C., at which ethylene was continuously fed to the reaction vessel together with 0.52 mol of triethylaluminum to start preliminary polymerization. Preliminary polymerization was continued for 0.5 hour to obtain polyethylene in a yield of 11 g per gram of the solid catalyst component. After completion of the preliminary polymerization, the reaction product was cooled and washed with n-hexane.

3) Polymerization of Ethylene

To a continuous polymerization apparatus having a 500 l reactor were continuously fed 27 kg/hr of ethylene, 63 kg/hr of n-hexane, and hydrogen in such an amount that the resulting polyethylene might have the intrinsic viscosity shown in Table 1. Simultaneously, the preliminarily polymerized catalyst prepared in (2) above and triethylaluminum were introduced at a rate of 2.5 g/hr and 1.5 g/hr, respectively. Homopolymerization of ethylene was carried on at 80° C. under a total pressure of 25 kg/cm$^2$ for an average retention time of 3 hours. The polyethylene in the reactor was forwarded to a degassing tank at a rate of 25 kg/hr, roughly separated, and dried to obtain a powdered polymer.

EXAMPLE 9

1) Preparation of Solid Catalyst Component

A 3 l flask equipped with a condenser was thoroughly dried and purged with nitrogen, and 133 g (1.16 mol) of Mg(OEt)$_2$ and 197 g (0.58 mol) of Ti(OBu)$_4$ were charged therein. The mixture was heated at 130° C. for 4 hours with stirring to obtain a uniform viscous liquid. After cooling to about 80° C., 1.0 l of toluene was added thereto obtain a uniform toluene solution.

The whole amount of the toluene solution was transferred to a 24 l autoclave having been thoroughly dried and purged with nitrogen.

A previously prepared heated solution containing 1.044 mol of TiOCl$_2$ and 11.6 mol of TiCl$_4$ was added to the above toluene solution over a period of 3 hours. Subsequently, the mixture was heated up to 105° C. over a period of 30 minutes, at which the mixture was maintained for 1 hour. After cooling, the reaction product was washed with n-hexane to obtain a solid catalyst component. The Ti content in the resulting solid catalyst component was 35.0%.

2) Preliminary Polymerization of Ethylene

Ethylene was preliminarily polymerized under the same conditions as in Example 8, except for using 730 g of the above-prepared solid catalyst component and 0.52 mol of triethylaluminum.

3) Polymerization of Ethylene

Ethylene was polymerized in the same manner as in Example 8, except for feeding 2.5 g/hr of the above preliminarily polymerized catalyst and 1.8 g/hr of triethylaluminum.

EXAMPLE 10

1) Polymerization of Ethylene

Ethylene was polymerized in the same manner as in Example 8, except for feeding hydrogen and, in addition, butene-1 at such a rate that the resulting ethylene polymer might have the intrinsic viscosity and density shown in Table 1.

EXAMPLE 11

1) Polymerization of Ethylene

To the same continuous polymerization apparatus as used in Example 8 were fed continuously 27 kg/hr of ethylene, 63 kg/hr of n-hexane, and hydrogen at such a rate that the resulting polyethylene might have the intrinsic viscosity shown in Table 1. Simultaneously, 1.7 g/hr of the same preliminarily polymerized catalyst component as prepared in Example 8 and 2.0 g/hr of triethylaluminum were fed thereto to conduct polymerization at 90° C. under a total pressure of 25 kg/cm$^2$ to obtain polyethylene having a viscosity-average molecular weight of 90,000 in a proportion of 70% based on the total polymer produced. The polyethylene in the reactor was forwarded to a degassing tank at a prescribed speed, where hydrogen was separated, and then to a 500 l reactor for second stage reaction. To the second stage reactor were continuously fed 11.6 kg/hr of ethylene and 27 kg/hr of n-hexane to conduct polymerization at 50° C. to produce second-stage polyethylene having a viscosity-average molecular weight of 1,100,000 in a proportion of 30% based on the total polymer produced. After completion of the reaction, the whole polymer had a viscosity-average molecular weight of 270,000.

Comparative Example 1

1) Polymerization of Ethylene

Ethylene was polymerized in the same manner as in Example 1, except for introducing the preliminarily polymerized catalyst and triethylaluminum at a rate of 1.3 g/hr and 5.3 g/hr, respectively.

Comparative Example 2

1) preparation of Solid Catalyst Component

To a 24 l autoclave having been thoroughly dried and purged with nitrogen were charged 133 g (1.16 mol) of Mg(OEt)$_2$, 160 g (0.53 mol) of Ti(OBu)$_3$Cl, and 138 g (0.40 mol) of Zr(OBu)$_3$Cl. The mixture was heat treated at 130° C. for 4 hours with stirring to obtain a uniform viscous liquid. After cooling to about 80° C. 3.5 l of toluene was added thereto to prepare a uniform toluene solution. To the toluene solution were added 210 g of ethylaluminum dichloride [EtAlCl$_2$] at 40° C. over a period of 1.5 hours and then 490 g of EtAlCl$_2$ over another 1.5 hours, followed by stirring at 80° C. for 2 hours. After cooling, the reaction product was washed with n-hexane to obtain a solid catalyst component. The Ti content in the solid catalyst component was 10.1%.

2) polymerization of Ethylene

To a continuous polymerization apparatus having a 500 l reactor were fed continuously 13 kg/hr of ethylene, 32 kg/hr of n-hexane, and hydrogen at such a rate that the resulting polyethylene might have the intrinsic viscosity shown in Table 1. Simultaneously, 1.7 g/hr of the above prepared solid catalyst component and 4.4 g/hr of triethylaluminum were fed thereto to conduct polymerization at 90° C. under a total pressure of 25 kg/cm$^2$ to obtain polyethylene having a viscosity-average molecular weight of 60,000 in a proportion of 60% based on the total polymer produced. The polyethylene in the reactor was introduced into a degassing tank at a prescribed speed, where hydrogen was separated, and then into a 500 l reactor for second stage reaction. To the second stage reactor were continuously fed 11 kg/hr of ethylene and 21 kg/hr of n-hexane to conduct polymerization at 50° C. to produce second-stage polyethylene having a viscosity-average molecular weight of 640,000 in a proportion of 40% based on the total polymer produced. After completion of the reaction, the whole polymer had a viscosity-average molecular weight of 270,000.

Comparative Example 3

Ethylene was polymerized in the same manner as in Example 1, except for introducing triethylaluminum at a rate of 1.65 g/hr and changing the amount of hydrogen introduced so as to obtain the intrinsic viscosity shown in Table 1.

Comparative Example 4

Ethylene was polymerized in the same manner as in Example 5, except for introducing the preliminarily polymerized catalyst and triethylaluminum at a rate of 1.3 g/hr and 5.3 g/hr, respectively.

Comparative Example 5

1) Preparation of Solid Catalyst Component

To a 24 l autoclave having been thoroughly dried and purged with nitrogen were charged 133 g (1.16 mol) of Mg(OEt)$_2$, 160 g (0.53 mol) of Ti(OBu)$_3$Cl, and 138 g (0.40 mol) of Zr(OBu)$_3$Cl. The mixture was heat treated at 130° C. for 4 hours with stirring to obtain a uniform viscous liquid. After cooling to about 80° C., 3.5 l of toluene was added thereto to prepare a uniform toluene solution. To the toluene solution were added 210 g of EtAlCl$_2$ at 40° C. over a period of 1.5 hours and then 490 g of EtAlCl$_2$ over another 1.5 hours, followed by stirring at 80° C. for 2 hours. After cooling, the reaction product was washed with n-hexane to obtain a solid catalyst component. The Ti content in the solid catalyst component was 10.1%.

2) Polymerization of Ethylene

To a continuous polymerization apparatus having a 500 l reactor were fed continuously 13 kg/hr of ethylene, 32 kg/hr of n-hexane, and hydrogen at such a rate that the resulting polyethylene might have the intrinsic viscosity shown in Table 1. Simultaneously, 1.7 g/hr of the above prepared solid catalyst component and 4.4 g/hr of triethylaluminum were fed thereto to conduct polymerization at 90° C. under a total pressure of 25 kg/cm$^2$ to obtain polyethylene having a viscosity-average molecular weight of 60,000 in a proportion of 60% based on the total polymer produced. The polyethylene in the reactor was introduced into a degassing tank at a prescribed speed, where hydrogen was separated, and then into a 500 l reactor for second stage reaction. To the second stage reactor were continuously fed 11 kg/hr of ethylene and 21 kg/hr of n-hexane to conduct polymerization at 50° C. to produce second-stage polyethylene having a viscosity-average molecular weight of 640,000 in a proportion of 40% based on the total polymer produced. After completion of the reaction, the whole polymer had a viscosity-average molecular weight of 270,000.

Comparative Example 6

Ethylene was polymerized in the same manner as in Example 5, except for introducing triethylaluminum at a rate of 1.65 g/hr and changing the amount of hydrogen introduced so as to obtain the intrinsic viscosity shown in Table 1.

Comparative Example 7

Ethylene was polymerized in the same manner as in Example 8, except for introducing the preliminarily polymerized catalyst and triethylaluminum at a rate of 1.3 g/hr and 6.1 g/hr, respectively.

Comparative Example 8

Ethylene was polymerized in the same manner as in Example 8, except for introducing the preliminarily polymerized catalyst and triethylaluminum at a rate of 1.3 g/hr and 5.7 g/hr, respectively.

Comparative Example 9

Ethylene was polymerized in the same manner as in Example 8, except for introducing the preliminarily polymerized catalyst and triethylaluminum at a rate of 1.7 g/hr and 3.5 g/hr, respectively.

Comparative Example 10

1) Preparation of Solid Catalyst Component

To a 24 l autoclave having been thoroughly dried and purged with nitrogen were charged 133 g (1.16 mol) of Mg(OEt)$_2$, 160 g (0.53 mol) of Ti(OBu)$_3$Cl, and 138 g (0.40 mol) of Zr(OBu)$_3$Cl. The mixture was heat treated at 130° C. for 4 hours with stirring to obtain a uniform viscous liquid. After cooling to about 80° C., 3.5 l of toluene was added thereto to prepare a uniform toluene solution. To the toluene solution were added 210 g of EtAlCl$_2$ at 40° C. over a period of 1.5 hours and then 490 g of EtAlCl$_2$ over another 1.5 hours, followed by stirring at 80° C. for 2 hours. After cooling, the reaction product was washed with n-hexane to obtain a solid catalyst component. The Ti content in the solid catalyst component was 10.1%.

2) Polymerization of Ethylene

To a continuous polymerization apparatus having a 500 l reactor were fed continuously 27 kg/hr of ethylene, 63 kg/hr of n-hexane, and hydrogen at such a rate that the resulting polyethylene might have the intrinsic viscosity shown in Table 1. Simultaneously, 1.7 g/hr of the above prepared solid catalyst component and 4.4 g/hr of triethylaluminum were fed thereto to conduct polymerization at 90° C. under a total pressure of 25 kg/cm$^2$ to obtain polyethylene having a viscosity-average molecular weight of 90,000 in a proportion of 90% based on the total polymer produced. The polyethylene in the reactor was forwarded to a degassing tank at a prescribed speed, where hydrogen was separated, and then to a 500 l reactor for second stage reaction. To the second stage reactor were continuously fed 3 kg/hr of ethylene and 7 kg/hr of n-hexane to conduct polymerization to produce a second-stage polyethylene having a viscosity-average molecular weight of 1,100,000 in a proportion of 10% based on the total polymer produced. After completion of the reaction, the whole polymer had a viscosity-average molecular weight of 160,000.

Comparative Example 11

A commercially available ethylene polymer Sholex 4551H, produced by Showa Denko, K.K., was used.

Evaluation

A hundred parts of the ethylene polymers obtained in Examples 1 to 11 and Comparative Examples 1 to 11 were mixed with 0.1 part of Irganox 1010 (hindered phenol type stabilizer, produced by Ciba-Geigy Ltd.), 0.05 part of Irgafos 168 (phosphite type stabilizer, produced by Ciba-Geigy Ltd.), and 0.1 part of calcium stearate, and the mixture was pelletized. The pellets were subjected to various physical properties measurements and a molding test. The results obtained are shown in Table 1.

TABLE 1

| Example No. | TEA* Concentration × (Al/Ti) (mmol/l mol ratio) | Density (g/cm$^3$) | [η] (dl/g) | R Value | HLMI (g/10 min) | MT (g) | HRI-IZOD (J) | Stiffness (kg/cm$^2$) | RT (sec) | ESCR (hr) |
|---|---|---|---|---|---|---|---|---|---|---|
| Example 1 | 0.1 | 0.962 | 4.5 | 3.21 | 6 | 15.5 | 0.71 | 12600 | 53 | 160 |
| Example 2 | 0.1 | 0.964 | 4 | 3.01 | 8 | 13.7 | 0.59 | 13000 | 40 | 120 |
| Example 3 | 0.14 | 0.961 | 4.4 | 3.1 | 6.8 | 13.7 | 0.81 | 12000 | 38 | 180 |
| Example 4 | 0.22 | 0.959 | 4.3 | 2.82 | 4.5 | 16 | 0.75 | 11900 | 60 | 250 |
| Example 5 | 0.1 | 0.961 | 4.2 | 3.1 | 7 | 14.3 | 0.7 | 12300 | 43 | 190 |
| Example 6 | 0.14 | 0.961 | 4.6 | 3 | 6 | 15.9 | 0.75 | 12200 | 62 | 200 |
| Example 7 | 0.22 | 0.959 | 4.7 | 2.8 | 4.3 | 16.8 | 0.91 | 12000 | 80 | 260 |
| Example 8 | 0.1 | 0.962 | 4 | 2.95 | 7.8 | 14.5 | 0.67 | 12600 | 44 | 150 |
| Example 9 | 0.12 | 0.958 | 4.9 | 2.9 | 4 | 20 | 0.96 | 11900 | 119 | 270 |
| Example 10 | 0.1 | 0.961 | 3.8 | 3 | 10.1 | 13 | 0.75 | 12300 | 34 | 170 |
| Example 11 | 0.26 | 0.962 | 4 | 2.8 | 8 | 15.5 | 0.65 | 12500 | 55 | 165 |
| Comp. Ex. 1 | 2.4 | 0.961 | 3.4 | 2.31 | 5.8 | 10.4 | 0.6 | 12200 | 17 | 105 |
| Comp. Ex. 2 | — | 0.958 | 3.8 | 2.23 | 4 | 11.8 | 0.31 | 11600 | 24 | 155 |
| Comp. Ex. 3 | 0.12 | 0.966 | 1.8 | 2.73 | 18 | 7 | 0.2 | 13200 | 7 | 40 |
| Comp. Ex. 4 | 2.4 | 0.961 | 3.4 | 2.24 | 5.5 | 10.5 | 0.6 | 12100 | 18 | 90 |
| Comp. Ex. 5 | — | 0.958 | 3.8 | 2.3 | 4.3 | 11.3 | 0.43 | 11600 | 23 | 145 |
| Comp. Ex. 6 | 0.12 | 0.965 | 1.7 | 2.48 | 17 | 7.3 | 0.19 | 13100 | 4 | 55 |
| Comp. Ex. 7 | 3 | 0.961 | 3.4 | 2.3 | 5.5 | 12 | 0.57 | 12300 | 24 | 100 |
| Comp. Ex. 8 | 2.8 | 0.963 | 3.2 | 2.2 | 7 | 8 | 0.5 | 12800 | 5 | 70 |
| Comp. Ex. 9 | 0.8 | 0.965 | 1.9 | 2.45 | 17 | 7 | 0.15 | 13100 | 4 | 62 |
| Comp. Ex. 10 | — | 0.961 | 2.7 | 2.39 | 6.6 | 8.7 | 0.6 | 12100 | 8 | 85 |
| Comp. Ex. 11 | — | 0.951 | 2.3 | 2.48 | 3.6 | 9.7 | 0.37 | 9500 | 13 | 50 |

Note:
Triethylaluminum

EXAMPLE 12 AND COMPARATIVE EXAMPLE 12

Each of the high-density polyethylene resins (HDPE) prepared in Examples 1 to 10 and Comparative Examples 1 to 11 was melted in an extruder at a cylinder temperature of 185° to 215° C. and extruded at a dye temperature of 235° C. to obtain a parison having a diameter of 530 mm. The parison was clamped by mold blocks (60L saddle type having 40R corners; mold temperature: 20° C.) while controlling the drawdown so that the parison thickness immediately before blow molding might become uniform in the injection direction, inflated with air blown inside under a pressure of 6 kg/cm$^2$, and removed from the mold at 80° C. to obtain a 60 l-volume fuel tank weighing 7 kg or 10 kg.

A drop test and a fire resistance test of the resulting fuel tank were conducted according to the following test methods. Further, the wall thickness at the 40R corner was measured. The results obtained are shown in Table 2 below.

Drop Test Method

The fuel tank filled with an antifreeze was dropped from the height of 16 m at −40° C., and occurrence of cracks was observed.

Fire Resistance Test

The fuel tank set on a car-equivalent mount was tested in accordance with the fire resistance standard of plastic fuel tanks for automobiles specified by Ministry of Transport, Japan. After the fuel tank was pre-burnt for 60 seconds, a screen was interposed to make the flame indirect. The time required for gasoline to leak from the fuel tank was measured.

Separately, a fuel tank was prepared in the same manner as in Run No. 1, except for changing the blow molding conditions so as to give a 40R corner thickness of 2.2 mm. As a result, the resulting fuel tank weighed 5.9 kg, that was lighter than the tank of Run No. 1 by 1.1 kg. In a drop test, no breakage was observed. Further, with the cooling time being equal to that in Run No. 1, the temperature at which the molded article is removed from the mold could be reduced by 12° C., affording saving of about 24 seconds in cooling time.

TABLE 2

| Run No. | HDPE | Weight of Tank (kg) | 40R Corner Thickness (mm) | Strength in Drop Test | Fire Resistance (min) |
|---|---|---|---|---|---|
| Example 12: | | | | | |
| 1 | Example 1 | 7 | 2.9 | no breakage | 2.6 |
|   |           | 10 | —  | no breakage | 3.5 |
| 2 | Example 2 | 7 | 2.8 | no breakage | 2.5 |
|   |           | 10 | —  | no breakage | 3.4 |
| 3 | Example 3 | 7 | 2.8 | no breakage | 2.4 |
|   |           | 10 | —  | no breakage | 3.3 |
| 4 | Example 4 | 7 | 2.7 | no breakage | 2.7 |
|   |           | 10 | —  | no breakage | 3.6 |
| 5 | Example 5 | 7 | 2.9 | no breakage | 2.5 |
|   |           | 10 | —  | no breakage | 3.4 |
| 6 | Example 6 | 7 | 2.8 | no breakage | 2.7 |
|   |           | 10 | —  | no breakage | 3.6 |
| 7 | Example 7 | 7 | 2.7 | no breakage | 2.8 |
|   |           | 10 | —  | no breakage | 3.6 |
| 8 | Example 8 | 7 | 2.8 | no breakage | 2.6 |
|   |           | 10 | —  | no breakage | 3.5 |
| 9 | Example 9 | 7 | 2.9 | no breakage | 3.0 |
|   |           | 10 | —  | no breakage | 3.9 |
| 10 | Example 10 | 7 | 2.7 | no breakage | 2.4 |
|    |            | 10 | —  | no breakage | 3.2 |
| Comparative Example 12: | | | | | |
| 1' | Comparative Example 1 | 7 | 2.2 | breakage | 2.0 |
|    |                       | 10 | —  | no breakage | 2.8 |
| 2' | Comparative Example 2 | 7 | 2.1 | breakage | 2.1 |
|    |                       | 10 | —  | no breakage | 3.0 |
| 3' | Comparative Example 3 | 7 | 2.3 | breakage | 1.7 |
|    |                       | 10 | —  | breakage | 2.4 |
| 4' | Comparative Example 4 | 7 | 2.2 | breakage | 2.0 |
|    |                       | 10 | —  | no breakage | 2.8 |
| 5' | Comparative Example 5 | 7 | 2.1 | breakage | 2.1 |
|    |                       | 10 | —  | no breakage | 3.0 |
| 6' | Comparative Example 6 | 7 | 2.3 | breakage | 1.7 |
|    |                       | 10 | —  | breakage | 2.3 |
| 7' | Comparative Example 7 | 7 | 2.3 | breakage | 2.0 |
|    |                       | 10 | —  | no breakage | 2.7 |
| 8' | Comparative Example 8 | 7 | 2.2 | breakage | 1.8 |
|    |                       | 10 | —  | no breakage | 2.4 |
| 9' | Comparative Example 9 | 7 | 2.4 | breakage | 1.6 |
|    |                       | 10 | —  | breakage | 2.2 |
| 10' | Comparative Example 10 | 7 | 2.2 | breakage | 1.8 |
|     |                        | 10 | —  | no breakage | 2.4 |
| 11' | Comparative Example 11 | 7 | 2.4 | breakage | 1.9 |
|     |                        | 10 | —  | no breakage | 2.7 |

EXAMPLE 13

The resins shown in Table 3 below were separately melted in the respective extruder, laminated in the same die having concentric ring flow paths (die temperature: 230° C.), and co-extruded to form a parison having a diameter of 530 mm. The parison was inflated in the same manner as in Example 12 to obtain a 60 l-volume multi-layer (5 layers of 3 kinds of resins) fuel tank weighing 7 kg. The resulting fuel tank showed no breakage in the same drop test as in Example 12. The wall thickness at the 40R corner was 2.9 mm.

TABLE 3

| Layer | Resin | Thickness*** (μm) |
|---|---|---|
| Outer | HDPE of Example 1 | 2600 |
| Adhesive | APO* | 100 |
| Barrier | MPA** | 100 |
| Adhesive | APO | 100 |
| Inner | HDPE of Example 1 | 2600 |

Note:
*Modified polyethylene (APO): High-density polyethylene having a density of 0.960 g/cm³ modified by grafting 0.4% of maleic anhydride; MI: 0.1 g/10 min.
**Modified polyamide resin composition (MPA): A mixture consisting of 80 parts of nylon 6 having a relative viscosity of 4.0 and 20 parts of an ethylene-butene-1 copolymer (butene-1 content: 13 wt %; degree of crystallization: 20%; MI: 3.5 g/10 min) modified with 0.3% of maleic anhydride.
***Layer thickness at a portion other than the 40R corner.

The present invention provides an ethylene polymer having excellent uniform stretchability, high stiffness, and high mechanical characteristics such as impact resistance; and a fuel tank that is light and excellent in impact strength and fire resistance even with a reduced thickness. The present invention makes it possible to produce fuel tanks at a reduced production cycle with a reduced cooling time and a reduced injection time.

While the invention has been described in detail and with reference to specific examples thereof, it will be apparent to one skilled in the art that various changes and modifications can be made therein without departing from the spirit and scope thereof.

What is claimed is:

1. A fuel tank obtained by blow molding of an ethylene homopolymer or copolymer comprising ethylene and not more than 10% by weight of an α-olefin having from 3 to 20 carbon atoms, said ethylene polymer having (1) an intrinsic viscosity of from 2 to 6 dl/g, (2) a density of from 0.945 to 0.970 g/cm³, (3) an R value of from 2.5 to 4, said R value being defined as a $\sigma_2/\sigma_1$ ratio, wherein $\sigma_1$ and $\sigma_2$ mean stress in elongation with a strain at 2 sec and 4 sec, respectively, under a flow at an elongational strain rate $\epsilon$ of 0.5 sec$^{-1}$, and (4) a relationship between high-velocity impact strength (HRI-IZOD) measured at −30° C. and a melt index under a load of 21.6 kg (HLMI) satisfying formula:

HRI-IZOD≧−log HLMI+1.15

2. A fuel tank as claimed in claim 1, wherein said fuel tank has a laminate structure composed of a gas barrier layer and a polyethylene layer comprising said ethylene polymer.

3. A fuel tank as claimed in claim 2, wherein said fuel tank is composed of a gas barrier layer having laminated thereon at least one side thereof a polyethylene layer comprising said ethylene polymer via an adhesive layer.

4. A fuel tank as claimed in claim 2, wherein said gas barrier layer comprises a polyamide resin.

5. A fuel tank as claimed in claim 4, wherein said gas barrier layer is a composition comprising a polyamide resin and a maleic anhydride-modified ethylene-α-olefin copolymer having a degree of crystallization of from 1 to 35% and a melt index (HLMI) of from 0.01 to 50 g/10 min and being modified with maleic anhydride at a grafting ratio of from 0.05 to 1% by weight.

6. A fuel tank as claimed in claim 3, wherein said adhesive layer comprises high-density polyethylene modified with 0.01 to 1% by weight of an unsaturated carboxylic acid or an anhydride thereof.

7. The fuel tank as claimed in claimed in claim 1, wherein (1) the intrinsic viscosity is from 2.3 to 5.5 dl/g, (2) the density is from 0.955 to 0.970 g/cm³, (3) the R value is from 2.6 to 3.8, (4) the relationship between (HRI-IZOD) and (HLMI) satisfies the formula:

HRI-IZOD≧−log HLMI+1.4, and (5) the melt tension (MT) satisfies the relationship:

MI≧−12.4 log HLMI+23.5.

8. The fuel tank as claimed in claimed in claim 1, wherein (1) the intrinsic viscosity is from 3 to 5 dl/g, (2) the density is from 0.960 to 0.970 g/cm³, (3) the R value is from 2.7 to 3.5, (4) the relationship between (HRI-IZOD) and (HLMI) satisfies the formula:

HRI-IZOD≧−log HLMI+1.4, and (5) the melt tension (MT) satisfies the relationship:

MT≧−12.4 log HLMI+23.5.

9. The fuel tank as claimed in claimed in claim 1, wherein (1) the intrinsic viscosity is from 2.3 to 5.5 dl/g, (2) the density is from 0.955 to 0.970 g/cm³, (3) the R value is from 2.6 to 3.8, and (4) the relationship between (HRI-IZOD) and (HLMI) satisfies the formula:

HRI-IZOD≧−log HLMI+1.4.

10. The fuel tank as claimed in claimed in claim 1, wherein (1) the intrinsic viscosity is from 3 to 5 dl/g, (2) the density is from 0.960 to 0.970 g/cm³, (3) the R value is from 2.7 to 3.5, and (4) the relationship between (HRI-IZOD) and (HLMI) satisfies the formula:

HRI-IZOD≧−log HLMI+1.4.

11. The fuel tank as claimed in claim 2, wherein said gas barrier layer is made of nylon 6.

12. A fuel tank obtained by blow molding of an ethylene homopolymer or copolymer comprising ethylene and not more than 10% by weight of an α-olefin having from 3 to 20 carbon atoms, said ethylene polymer having (1) an intrinsic viscosity of from 2 to 6 dl/g, (2) a density of from 0.945 to 0.970 g/cm³, and (3) an R value of from 2.5 to 4, said R value of from 2.5 to 4, said R value being defined as a $\sigma_2/\sigma_1$ ratio, wherein $\sigma_1$ and $\sigma_2$ mean stress in elongation with a strain at 2 sec and 4 sec, respectively, under a flow at an elongational strain rate $\epsilon$ of 0.5 sec$^{-1}$, (4) a relationship between high velocity impact strength (HRI-IZOD) measured at $-30°$ C. and a melt index under a load of 21.6 kg (HLMI) satisfying the formula:

HRI-IZOD$\geq -$log HLMI+1.15, and (5) a melt tension (MT) satisfying the relationship:

MT$\geq -$12.4 log HLMI+20.5.

13. A fuel tank as claimed in claim 12, wherein said fuel tank has a laminate structure composed of a gas barrier layer and a polyethylene layer comprising said ethylene polymer.

14. The fuel tank as claimed in claim 12, wherein said gas barrier layer is made of nylon 6.

15. A fuel tank as claimed in claim 13, wherein said fuel tank is composed of a gas barrier layer having laminated on at least one side thereof a polyethylene layer comprising said ethylene polymer via an adhesive layer.

16. A fuel tank as claimed in claim 13, wherein said gas barrier layer comprises a polyamide resin.

17. A fuel tank as claimed in claim 16, wherein said gas barrier layer is a composition comprising said polyamide resin and a maleic anhydride modified ethylene-$\alpha$-olefin copolymer having a degree of crystallization of from 1 to 35% and a melt index (HLMI) of from 0.01 to 50 g/10 min and being modified with maleic anhydride at a grafting ratio of from 0.05 to 1% by weight.

18. A fuel tank as claimed in claim 15, wherein said adhesive layer comprises high-density polyethylene modified with 0.01 to 1% by weight of an unsaturated carboxylic acid or an anhydride thereof.

* * * * *